United States Patent

Ritter

[15] 3,667,314
[45] June 6, 1972

[54] VARIABLE RATIO LEVER MECHANISM

[72] Inventor: Thomas E. Ritter, Utica, Mich.
[73] Assignee: General Motors Corporation, Detroit, Mich.
[22] Filed: Nov. 24, 1970
[21] Appl. No.: 92,484

[52] U.S. Cl. .................................................. 74/518
[51] Int. Cl. ........................................... G05g 1/04
[58] Field of Search .............................. 74/516, 518

[56] References Cited

UNITED STATES PATENTS

| | | | |
|---|---|---|---|
| 2,977,817 | 4/1961 | Panasewicz | 74/516 |
| 2,490,555 | 12/1949 | Songer | 74/516 |
| 2,755,891 | 7/1956 | Levell et al. | 74/516 X |
| 2,844,228 | 7/1958 | Schnell | 74/516 X |

Primary Examiner—William F. O'Dea
Assistant Examiner—P. D. Ferguson
Attorney—W. E. Finken and D. D. McGraw

[57] ABSTRACT

A variable ratio lever mechanism for a power booster assisted motor vehicle braking system includes a variable ratio fulcrum mechanism which normally establishes a first pivot point providing the relatively low mechanical advantage needed for booster assisted actuation of the brake system. A force sensitive locking mechanism allows the first pivot point to break away when the reaction force acting thereon exceeds that associated with booster assisted break actuation and establishes a second pivot point of relatively higher mechanical advantage enabling the vehicle operator to actuate the break system independent of the booster assist.

3 Claims, 2 Drawing Figures

INVENTOR.
Thomas E. Ritter
BY
D.D. McGraw
ATTORNEY

VARIABLE RATIO LEVER MECHANISM

The present invention relates to a variable ratio lever mechanism and more particularly to a variable ratio brake actuating mechanism for power boosted motor vehicle brake systems.

It is desirable in a motor vehicle brake actuating linkage to provide a brake actuating mechanism having a relatively high mechanical advantage in order to provide actuation of the brakes with a minimum of operator applied pedal force. On the other hand, it is desirable to provide a relatively low mechanical advantage so as to minimize the distance through which the brake pedal must be moved to actuate the brake. The conflict between these objects becomes especially difficult to resolve in a motor vehicle having a power boosted brake system. Such a power boosted brake system requires a relatively low pedal force and is thus compatible with a pedal mechanism having a relatively low mechanical advantage. However, in the event of power runout or a failure of the power booster, brake actuation with a brake pedal mechanism having a relatively low mechanical advantage requires the vehicle operator to apply a braking force which may be considered burdensome. Accordingly, it is desirable to provide a brake actuating mechanism having a relatively low mechanical advantage during power assisted brake actuation and a relatively high mechanical advantage for brake actuation independent of the booster assist.

The present invention provides a vehicle brake actuating mechanism especially adapted for use in conjunction with a power boosted brake system. The brake actuating pedal mechanism is sensitive to the operator applied force and shifts from a pedal pivot having a relatively low mechanical advantage to a pivot having a relatively high mechanical advantage when the operator applied input force reaches a predetermined threshold. The invention provides a brake applying lever having a brake pedal and a power booster actuating rod. The brake lever is pivotally attached to a first pivot assembly which slidably mounts the brake lever to a support bracket. A snap lock in the form of a spring biased ball engages a ramp surface on the first pivot assembly and holds the first pivot assembly fixed in relation to the support bracket, thereby providing a fixed pivot point having a relatively low mechanical advantage. A second pivot assembly is also pivotally attached to the brake lever and slidably engages the support bracket. A spring biased friction lock adapted to lock the second pivot assembly to the support bracket extends into engagement with the first pivot assembly and is thereby normally held in an unlocked position allowing slidable movement of the second pivot assembly relative to the fixed housing as the brake lever rotates about the first pivot point. The snap lock is constructed to hold the first pivot assembly against the reaction of the pedal force which is encountered with power assisted actuation of the brake system. Upon power runout or failure of the power booster, the vehicle operator must apply a greater force to the brake pedal in order to attain the necessary degree of brake actuation. The reaction of this greater pedal force acting on the first pivot exceeds the holding force of the snap lock spring. Release of the snap lock allows the first pivot member to slide out of engagement with the friction lock, thereby permitting the friction lock to engage the second pivot member to fix the second pivot point so that subsequent brake applying pedal lever movement provides a relatively high mechanical advantage enabling the vehicle operator to more easily actuate the brake system without power assist.

Figures 1, 2:
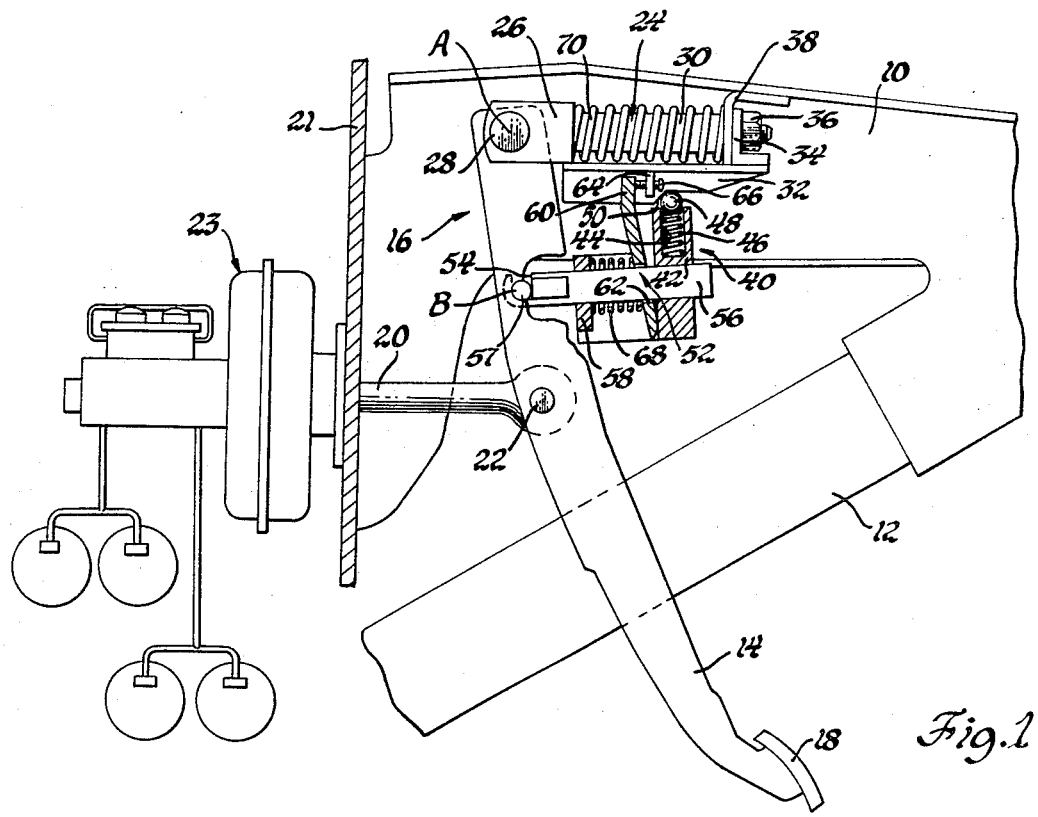
FIG. 1 is an elevation view having parts broken away and in section and showing the variable ratio lever mechanism in the brake released position with the brake lever poised for movement about pivot A.
FIG. 2 is an elevation view having parts broken away and in section and showing the variable ratio lever mechanism in the brake applied position with the brake lever being pivoted about pivot B.

Referring to FIG. 1, the variable ratio brake actuating mechanism is shown as part of a brake system for a motor vehicle. Support bracket 10, a stationary structural member of the vehicle, serves as the mounting frame for the variable ratio brake actuating mechanism, and may be used to mount the steering column 12 and other components of the vehicle. A brake lever 14 is pivotally mounted at its upper end to the support bracket 10 by the variable ratio fulcrum mechanism represented generally at 16. The brake pedal 18 is attached at the lower end of brake lever 14. A push rod 20 is pivotally attached to the brake lever 14 by pin 22 and extends forwardly through the fire wall 21 into engagement with a suitable brake booster and master cylinder assembly 23. The force applied to the brake pedal 18 by the vehicle operator causes the brake lever 14 to rotate about the variable ratio fulcrum mechanism 16 causing push rod 20 to move forwardly into actuation of the power booster which provides power actuation of the master cylinder to apply the vehicle wheel brakes. The present invention can be used in combination with any power booster which is constructed to provide mechanical force transmission between the push rod 20 and the master cylinder for brake actuation independently of the power assist.

The variable ratio fulcrum mechanism 16 is responsive to the force input provided by the vehicle operator to selectively determine the ratio of operator applied input force to the brake actuating output force. The brake lever 14 is normally pivoted about point A as shown in FIG. 1. Pivot point A is defined by the first pivot assembly, indicated generally at 24. The first pivot assembly 24 includes a clevis 26 having laterally spaced arms between which the upper end of brake pedal 14 is located. Pin 28 pivotally attaches the clevis 26 to the upper end of the brake lever 14. Clevis 26 is suitably attached, as by welding, to one end of a rod 30 and a ramp member 32. The other ends of rod 30 and ramp member 32 are joined by bracket 34 which is suitably attached, as by welding, to ramp member 32 and by a nut 36 which threadedly engages the end of rod 30. A flange 38 is attached to and extends vertically downward from support bracket 10. Flange 38 is provided with a hole in which the rod 30 is slidable.

The clevis 26 is normally held stationary, as shown in FIG. 1, at its farthest leftward position wherein bracket 34 abuts flange 38. A snap lock assembly, generally indicated at 40, holds clevis 26 stationary against the reaction of the operator applied pedal force acting thereon, thereby providing the fixed pivot point A. The snap lock assembly 40 includes a lock housing 42 having a vertically extending chamber 44. Spring 46 is seated in chamber 44 and urges ball 48 into engagement with ramp member 32. The ramp member 32 includes a ramp surface 50 located thereon in relation to the snap lock assembly 40 and the flange 38 such that ball 48 engages the ramp surface 50 when the clevis 26 is located at its full leftward position. The inclination of ramp surface 50 and the spring rate of spring 46 are so selected that the ramp member 32 and attached clevis 26 are held stationary against the reaction at point A of the operator applied input force and the brake actuating output force corresponding to power boosted brake system actuation. If the power booster fails, thereby necessitating the application of a greater pedal force on the part of the vehicle operator in order to actuate the brakes, or when a similar condition occurs requiring increased brake actuating input force, the snap lock assembly 40 is overcome. This disengagement of snap lock assembly 40 occurs when the reaction force acting at pivot A overcomes spring 46 allowing ball 48 to retract into the lock housing 42. The rightward travel of ramp member 32 and the attached clevis 26 consequent to the release of snap lock assembly 40 results in the pivot point A breaking away.

Subsequent to the release of snap lock assembly 40, brake applying movement of brake lever 14 is about pivot point B which is established by the second pivot assembly, indicated generally at 52. It is evident from reference to the drawings that the pivot point B is located closer to the pivotal attachment of booster push rod 20 than is pivot point A. Therefore, an increased mechanical advantage is provided when the brake lever 14 is pivoted about pivot point B. Second pivot assembly 52 includes a rod 56 having a slot 54 in one end thereof which engages a pin 57 attached to and extending laterally from the brake lever 14. The other end of rod 56 is slidably supported in coaxial holes through the lower end of lock housing 42 and a flange 58 which is attached to and extends laterally from support bracket 10. Rod 56 is adapted to be locked relative to the support bracket 10 by locking lever 60. The lower end of locking lever 60 has a hole 62 extending therethrough at an acute angle relative to the longitudinal axis of the locking lever. The rod 56 extends through angular hole 62 of locking lever 60. The upper end of locking lever 60 extends into engagement with an adjusting screw 66 which is threadedly mounted in a vertically extending abutment 64 attached to ramp member 32. As shown in FIG. 1, the adjusting screw 66 normally holds locking lever 60 so that the angular hole 62 and rod 56 are coaxial, thereby allowing rod 54 to slide freely relative to the support bracket 10. When snap lock assembly 40 is overcome, the upper end of locking lever 60 follows the rightward movement of ramp member 32 and adjusting screw 66 at the urging of spring 68. Spring 68 encircles rod 56 and acts between flange 58 and the locking lever 60. When the ramp member 32 and upper end of lock lever 60 have moved sufficiently rightward to allow the walls of angular hole 62 to frictionally engage rod 56, the abutting engagement of at least the lower end of locking lever 60 with lock housing 42 prevents further sliding movement of rod 56 relative to the support brackets 10. FIG. 2 shows the walls of angular hole 62 frictionally engaging rod 56 and locking lever 50 engaging lock housing 42 so that subsequent brake applying movement of brake lever 14 is about the fixed pivot point B which provides a relatively high mechanical advantage allowing the vehicle operator comparative ease of actuating the vehicle brakes independent of operation of the power booster.

When the operator applied input force is removed, a return spring 70 which encircles rod 30 and is seated at flange 38 and clevis 26 acts to return the ramp member 32 to the full leftward position as shown in FIG. 1. It is noted that release spring 70 should be selected to provide only that minimum force required to return the first pivot assembly 24 leftward since the release spring 70 must be collapsed during pivoting of the brake lever 14 about pivot point B.

The present invention may be adapted for use in conjunction with power boosted brake actuating systems having a wide variety of operating characteristics. It is noted that the ratio of input to output force may be widely varied as may prove desirable for application of the invention to a particularly designed brake system by varying the dimensions between the pivot A and pivot B relative to the input force and output force acting respectively at brake pedal 18 and pivot pin 22.

What is claimed is

1. A variable ratio lever mechanism comprising:
    a stationary member;
    a lever having spaced force input and output means;
    first pivot means pivotally attached to said lever and slideably engaging said stationary member;
    a second pivot means pivotally attached to said lever in spaced relation from said first pivot means and slidably engaging said stationary member;
    first and second lock means respectively associated with said first and second pivot means, the respective lock means being effective to selectively prevent and permit movement of the associated pivot means relative the stationary bracket, the first lock means being normally engaged to prevent such movement and being force responsive to permit sliding movement of the first pivot means relative the stationary bracket when a predetermined force is applied thereto;
    and lock operating means independent of the lever and effective to engage the second lock means to prevent movement of the second pivot means when the first lock means permits movement of the first pivot member.

2. A lever mechanism providing a varying ratio of force input to force output and comprising:
    a stationary member;
    a lever having attached thereto in spaced relation a first pivot, a second pivot, a force output member, and a force input member;
    a first pivot member pivotally attached to said lever by said first pivot and slidably engaging said stationary member;
    first lock means acting between said first pivot member and said stationary member and normally holding said first pivot member stationary to establish a first pivot point for said lever, said first lock means yielding in response to a predetermined force acting on the first pivot member to permit sliding movement of the first pivot member relative the stationary member;
    a second pivot member pivotally attached to said lever by said second pivot and slidably engaging said stationary member;
    second lock means acting between said second pivot member and said stationary member normally permitting sliding movement of said second pivot member relative said stationary member;
    and means in connection between the first lock means and second lock means independent of said lever and effective to operate said second latch means to lock said second pivot member from sliding movement relative said stationary member in response to sliding movement of said first pivot member relative said stationary member whereby a second pivot point for said lever is established and the ratio of force input to force output is varied.

3. A lever mechanism providing a varying ratio of force input to force output and comprising:
    a stationary member;
    a lever having attached thereto in spaced relation a first pivot, a second pivot, a force output member and a force input member;
    a first pivot member pivotally attached to said lever by said first pivot and slidably engaging said stationary member, said first pivot member having a ramp surface;
    snap lock means including a spring biased member normally engaging said ramp surface of said first pivot member to hold said first pivot member stationary to establish a first pivot point for said lever, said snap lock means being overcome at a predetermined force level whereby said first pivot member is released for slidable movement relative to said stationary member;
    a second pivot member pivotally attached to said lever by said second pivot and slidably engaging said stationary member;
    friction lock means engageable to hold said second pivot member stationary and including a spring biased friction member extending into engagement with said first pivot member and normally being held out of locking engagement with said second pivot member to allow sliding of said second pivot member relative to said stationary member, said spring biased friction member lockingly engaging said second pivot member when said first pivot member moves slidably whereby a second pivot point for said lever is established;
    and means effective upon release of input force to return the lever mechanism to normal condition wherein said first pivot point is established.

* * * * *